Dec. 23, 1924.  
G. H. ELLIS  
1,520,284  
COMPOSITE INSULATING BOARD  
Filed Jan. 4, 1924
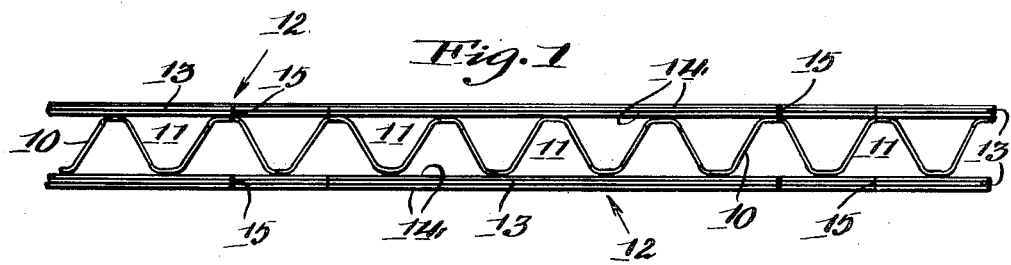
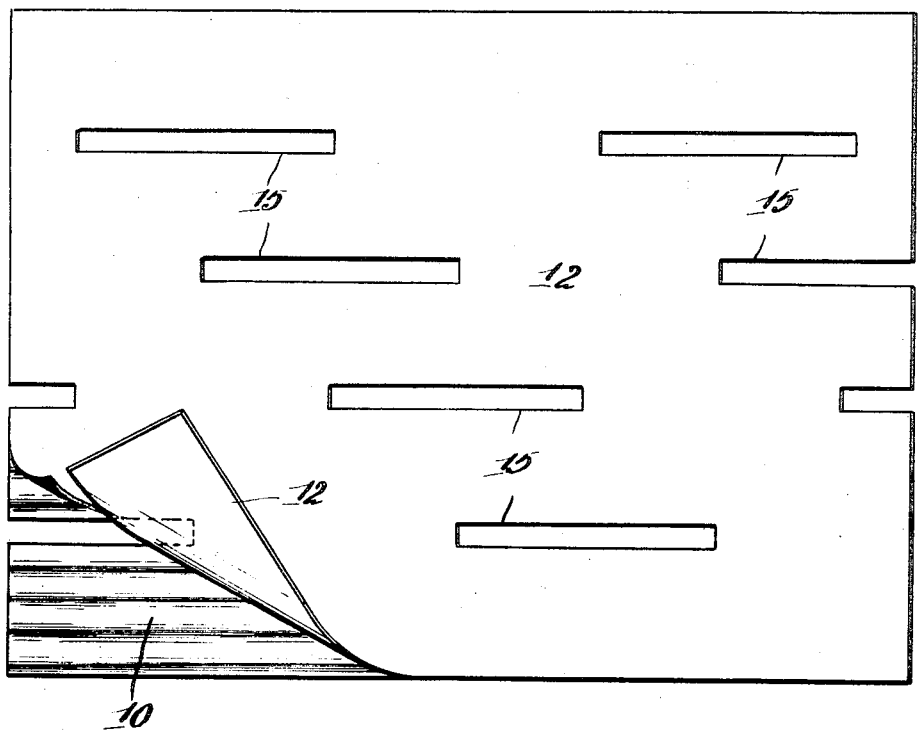
Inventor  
George H. Ellis  
By John E. Stryker  
his Attorney Patented Dec. 23, 1924.

1,520,284

UNITED STATES PATENT OFFICE.

GEORGE H. ELLIS, OF ST. PAUL, MINNESOTA.

COMPOSITE INSULATING BOARD.

Application filed January 4, 1924. Serial No. 684,328.

*To all whom it may concern:*

Be it known that I, GEORGE H. ELLIS, a citizen of the United States, residing at St. Paul, in the county of Ramsey and State of Minnesota, have invented new and useful Improvements in Composite Insulating Boards, of which the following is a specification.

The object of my invention is to produce an inexpensive wall or plaster board, which will at the same time be water proof and a good heat insulator.

A further object of this invention is to provide a board of this kind adapted to form a backing or support for plaster.

Other objects will appear and be more fully pointed out in the following specification and claims.

The material in common use for this purpose, if it possesses any considerable insulating value, is expensive, while the cheaper building papers and felts have comparatively little insulating value and are useless as a base for plaster. Generally speaking, my material is a multiple ply paste board with a corrugated or wrinkled core and water proof sheets on each side of the core. I am of course aware that wrapping material for fragile objects has been made of corrugated paste board, but so far as I know, no attempt has been made to adapt such material to building purposes, and in its usual form it would be useless for such purpose, both because of its perviousness to moisture and its lack of toughness and rigidity.

The corrugated core of my improved board is over-laid and enclosed in composite walls or surface sheets of disintegrated fibre or paper stock. Each of the outer walls is a relatively thin sheet of multiple ply paper made impervious to moisture by a central portion or layer impregnated with a bitumen. The surfaces are of pervious material adapted to make a good bond with plaster and also adapted to be securely attached by gluing to the core. These outer walls of the board are a molded product, preferably of the type described and claimed in my co-pending application for patent, filed March 26, 1923, Serial No. 627,689.

The accompanying drawings illustrate the best form of my device at present known to me. In the drawings, Figure 1 is an enlarged end view of my improved board and Fig. 2 is a plan view of the same with one corner of the composite surface sheet detached and turned back to show the corrugated core. In the drawings, I have used the numeral 10 to indicate the core, which is a sheet of disintegrated fibre or paper stock, corrugated to produce a series of separate air spaces 11 extending longitudinally within the board. Outer walls or sheets 12 of disintegrated fibre, are secured to the top and bottom of the core 10 by a suitable adhesive. These outer walls have a composite formation, being provided with central portions or layers 13 impregnated with a predetermined quantity of bituminous material. Between 30% and 40% of liquid bitumen in the paper stock of the central layer has been found to be sufficient to produce a board which is practically impervious to moisture. Both surfaces of each of the walls 12 are composed of a more or less porous or absorbent pulp containing little or no bitumen.

Obviously, when desired, the surface sheets of the board may be rendered more durable by the usual paper sizing and this is considered advantageous where it is to be exposed on the interior of buildings.

In use the ends of the air spaces 11 are closed by creasing the board across the corrugation in the core 10 or by otherwise pressing the surface sheets 12 together. In the construction of a building, the board may be fitted between the studding or joists so as to close the ends of the air spaces. Where the board is to be used as a backing or support for plaster, I provide a series of slots 15, preferably staggered, extending longitudinally with respect to the corrugations in the core 11, and for such use the sizing is omitted from the surface layer of the wall. Thus, as will be readily understood, plaster applied to the board will enter the slots 15 and thereby interlock with the board. In installing the board in the walls of a building, I prefer, in order to give the greatest strength possible to so place it that the dead air compartments 11 extend horizontally between the studding. The slots 15 will thus extend horizontally within the wall.

It will be evident that where the highest insulating qualities are required, the plain board, without the slots 15, may be used either as a backing for plaster or alone as an impervious heat insulating and sound deadening material.

Having described my invention what I claim as new and desire to protect by Letters Patent is:

1. A composite board of the class described comprising, a multiple ply surface sheet consisting of a plurality of layers of absorbent stock, and an intermediate layer impregnated with water proofing material, a second surface sheet in spaced parallel relation with said first mentioned sheet, and a core of sheet material uniting said surface sheets and crimped to form a plurality of dead air spaces of substantial size between said surface sheets.

2. A composite board of the class described comprising, an impervious surface sheet containing a substantial amount of bitumen, a second surface sheet in spaced parallel relation with said first mentioned sheet, and a core of sheet material uniting said surface sheets and forming a plurality of air spaces of appreciable size between said surface sheets.

3. A composite board of the class described comprising a pair of spaced, multiple ply, surface sheets each consisting of a plurality of layers of absorbent stock and an intermediate layer containing bituminous material, and a corrugated sheet constituting a core secured to the adjacent faces of said surface sheets.

4. A composite board of the class described comprising a pair of spaced multiple ply surface sheets, each consisting of a plurality of layers of absorbent stock, and an intermediate layer containing a predetermined quantity of bituminous material, and a corrugated sheet core secured to the adjacent faces of said surface sheets and forming with said sheets a series of parallel and separate air spaces within the board.

5. A board of the class described comprising, a corrugated core of sheet material, plain surface sheets secured to said core, and an interior layer of water proof material in at least one of said surface sheets.

6. A board of the class described, comprising a corrugated core of sheet material, a plain surface sheet disposed on one side of said core to form a support for plaster, said sheet being formed with a series of slots arranged in parallel relation with the corrugations in said core to interlock with plaster applied to the board, an interior layer in said sheet impregnated with a bitumen adapted to render the board impervious to moisture, and a second surface sheet secured to the opposite side of said core.

7. A board of the class described, comprising a plain surface sheet adapted to form a support for plaster, said sheet being provided with a series of horizontal slots arranged to interlock with plaster applied to the board, an interior layer in said sheet impregnated with a bitumen adapted to render the board impervious to moisture and a corrugated core secured to said sheet and forming therewith a series of dead air spaces extending in parallel relation with said slots.

In testimony whereof, I have hereunto signed my name to this specification.

GEORGE H. ELLIS.